M. O. REEVES.
TRANSMISSION BELT.
APPLICATION FILED JAN. 3, 1922.
1,435,737.
Patented Nov. 14, 1922.
2 SHEETS—SHEET 1.
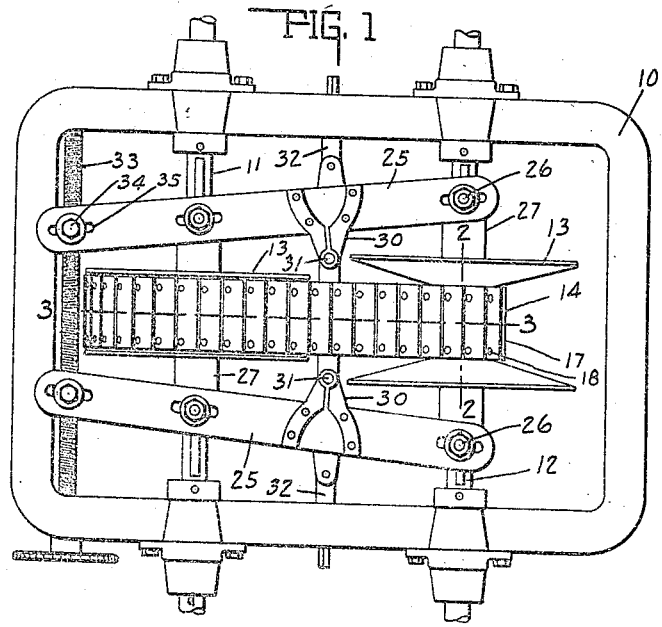
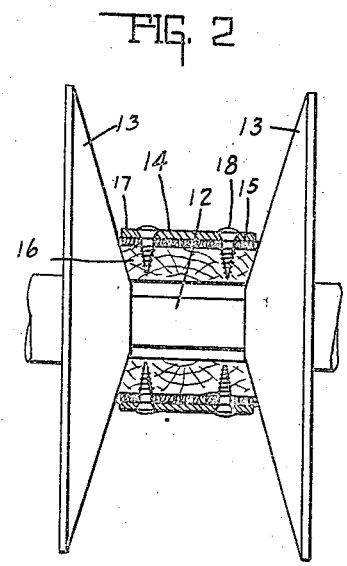
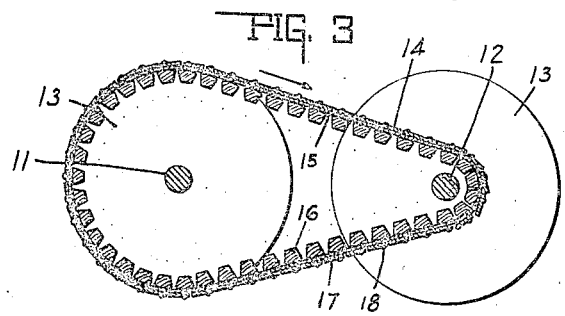
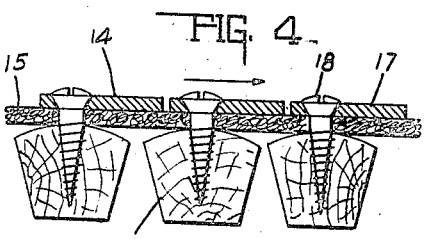
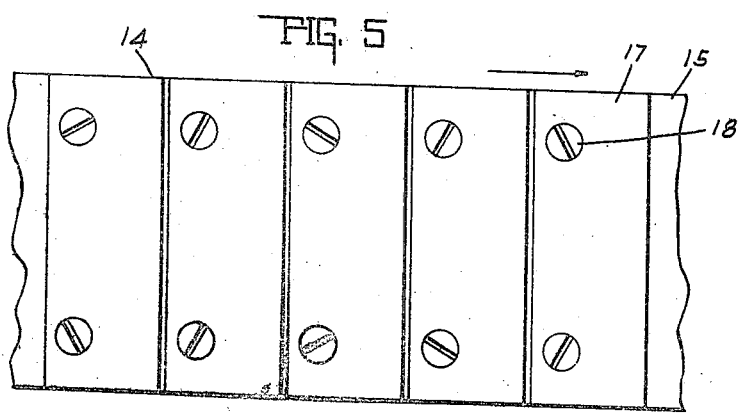
INVENTOR.
MILTON O. REEVES.

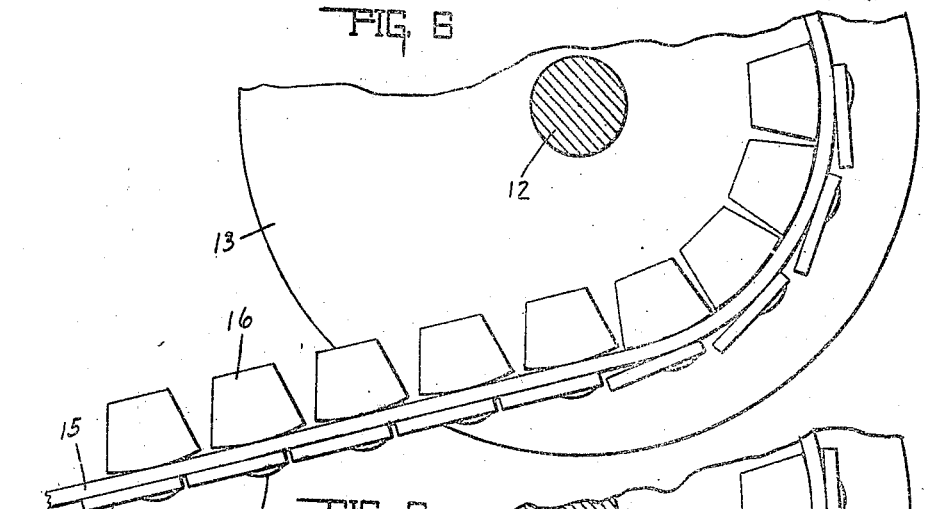
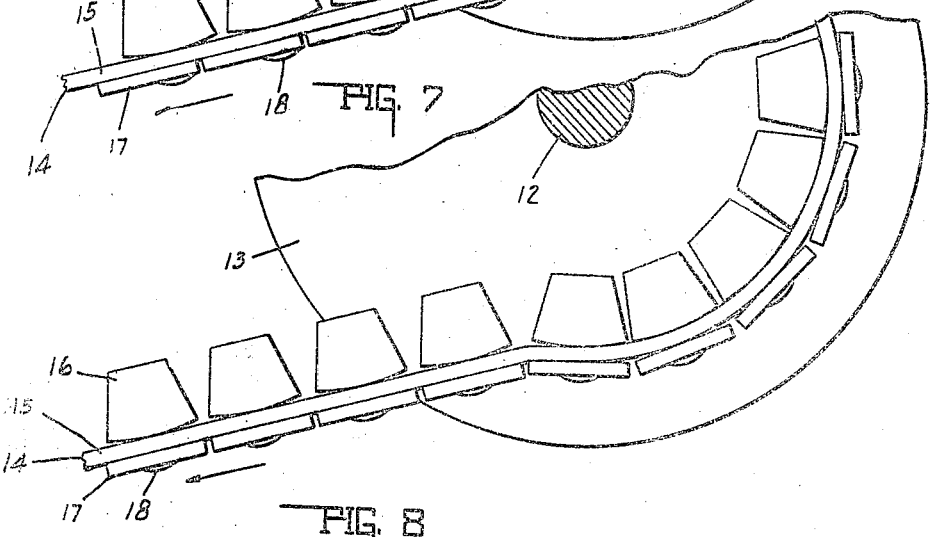
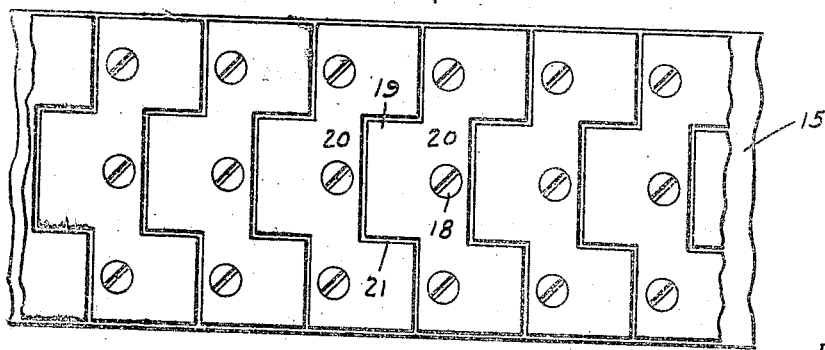

Patented Nov. 14, 1922.

1,435,737

UNITED STATES PATENT OFFICE.

MILTON O. REEVES, OF COLUMBUS, INDIANA, ASSIGNOR TO REEVES PULLEY COMPANY, OF COLUMBUS, INDIANA, A CORPORATION.

TRANSMISSION BELT.

Application filed January 3, 1922. Serial No. 526,573.

*To all whom it may concern:*

Be it known that I, MILTON O. REEVES, a citizen of the United States, and a resident of Columbus, county of Bartholomew, and State of Indiana, have invented a certain new and useful Transmission Belt; and I do hereby declare that the following is a full, clear, and exact description thereof, reference being had to the accompanying drawings, in which like numerals refer to like parts.

The object of this invention is to prolong the life and usefulness of belts used in speed varying transmissions in which there are two pairs of conical disks with the conical faces of each pair of disks adjacent each other and between which the belt operates, and by reason of the wedging of the belt between the disks, power will be transmitted to the belt or the belt will transmit power to the disks. The variation in speed in such apparatus depends upon how far the belt is located from the axes of the two pairs of disks, and this distance is predetermined by adjusting the disks of each pair towards or away from each other.

In such mechanism the belt is usually wedge-shaped at its sides so as to offer a great surface contact between the disks, and, therefore, cause great friction between them for the effective transmission of power.

Heretofore, these belts have usually been formed of a continuous flexible belt body with keystone-shaped contacting blocks secured to the inner side of the belt body by screws extending through sectional steel plates on the outer surface of the belt body and through the belt body into the blocks. These screws have been inserted centrally through said steel plates or midway between the sides of said plates.

In the use of the belt heretofore in mechanism of the kind described, the great strain on the belt causes said blocks to wedge between the conical faces of the disks with tremendous force so that when a block should leave a pair of disks, it is difficult to release it, wherefore the block lingers and is held too long instead of being released. This causes the belt body to bend or slightly change direction of travel and the outside plates at their advancing edges to buckle into and sharply engage the belt body at its bending point and crystallize the belt at that point and cause it soon to weaken and break.

The object of the present invention is to overcome this difficulty.

The chief feature of this invention consists in placing the screws through said outside steel plates near their following edges so that there is more distance between the screws and the advancing edge of a plate, and, therefore, more leverage in the plate, whereby said plate will tend more to travel in the direction of the belt body and not buckle into the belt body or cause it to bend, and the pull of the belt, acting through the wide area of the plate and the screws, will cause the latter to give the block a twisting action, when it is ready to leave the disks, and thus release the block sooner than in the construction heretofore used and tend to prevent the advancing edge of the plate buckling into the belt body every time the plate leaves the disks and the consequent bending, wearing and breakage of the belt body.

The full nature of the invention will be understood from the accompanying drawings and the following description and claims:

In the drawings, Fig. 1 is a plan view of what is known as the "Reeves speed varying transmission," parts being broken away. Fig. 2 is a view on the line 2—2 of Fig. 1, showing the belt in section and the other parts in elevation. Fig. 3 is a section on the line 3—3 of Fig. 1. Fig. 4 is a longitudinal central section of the portion of the belt on an enlarged scale. Fig. 5 is a plan view of a portion of the belt, parts being broken away. Fig. 6 is a central longitudinal vertical section of a portion of the belt and one of the disks, as the belt is leaving the disks. Fig. 7 is the same as Fig. 6, showing the old form of belt and its action. Fig. 8 is a plan view of a modified form of the belt.

In the drawings there is shown a rectangular frame 10 in Fig. 1 in which two parallel shafts 11 and 12 are mounted, one of which is the driving shaft and the other the driven shaft, the ultimate driving and driven means not being shown. On each shaft there is mounted a similar pair of cone disks 13 with their conical faces towards each other, and in engagement with which a belt body 14 operates, said belt being wedge-shaped in cross section. Each of said disks is mounted so as to be slidable longitudinally of its shaft and is splined thereon so that power will be transmitted from one member to the other.

The disks of each pair are moved and adjusted into relative positions and held in adjusted positions by two pairs of levers 25, one lever of each pair being under what is shown in Fig. 1 and parallel therewith. There is one pair of said levers 25 on each side of the two pairs of cone disks. Each lever is pivotally connected by the screw 26 with a sleeve, not shown, which is slidable on the shafts 11 and 12 in bearing engagement with the hubs 27 of the disks 13. The levers 25 have extensions 30, whereby they are fulcrumed at 31 on a take-up screw rod 32 which is constructed so as to give the belt the desired tension, and which construction is well known in this art and is no part of this invention. The levers 25 are similarly operated for shifting the disks to obtain the desired speed by the screw rod 33 mounted in the frame and loosely connected with the ends of said levers by means 34 projecting through slots 35 in said levers. This causes simultaneous operation of all the levers 25 and adjustment of all the disks 13, so that while one pair of disks are being moved apart, the other pair is being correspondingly moved towards each other, and thereby the position of the belt with relation to the axes of the two pairs of cone disks is adjusted and the speed predetermined.

The foregoing parts of the apparatus are old and well known in the art. The belt as a whole is formed as shown in Figs. 2, 3, 4 and 5. It consists of a continuous belt body 15, blocks 16 on the inside to wedge between and frictionally engage the disks, steel plates 17 on the outside, and screws 18 extending through the steel plates, belt body, and into the wedging blocks 16. The wooden blocks 16 are keystone shape in cross section, as shown in Fig. 4, so that they may travel around the axis of the cone disks, as shown in Fig. 6. The ends of said blocks are also beveled, as shown in Fig. 2, with the same obliquity as the conical faces of the disks, and preferably leather faced, so that there will be as much friction as possible between the blocks and the disks.

In operation there is a powerful wedging action of the belt, under the strain put on it, between the two disks, as shown in Fig. 2. Fig. 7 illustrates the action of the old form of belt as it leaves the pulley. It requires a considerable pull or twisting action on the block as it leaves the disks to release it. Heretofore the screws 18 have been inserted through the middle of the steel plate 17, as shown in Fig. 7. In the use of such construction just before the block 16 was released from the disks, the advancing edge of the plate 17 would buckle into the belt body by the pull of the belt, pulling down on the advancing edge of the plate in an effort to straighten, and the leverage of the plate, as heretofore mounted, was not sufficient to enable the block to be unwedged without a considerable strain on the belt body and not until after the belt body had been bent over the advancing edge of the plate, as shown in Fig. 7.

In this invention the screws 18 are inserted through the plate 17 near the following edge, as shown in Figs. 4 and 5. This places the screws 18 as far away from the advancing edge of the plate 17 as possible and the benefit of this is indicated in Fig. 6. As a block approaches the releasing point on the lower side of Fig. 6, the pull of the belt body on the relatively wide portion of the plate 17, between its advancing edge and the screws 18, would twist the block and release it sooner than in the construction shown in Fig. 7 and before the belt body was bent, as shown in Fig. 7, over the advancing edge of the plate. In other words, the belt can with this improved construction run substantially straight as it leaves the cone disks because the block will be sooner released by reason of the increased leverage of the plate 18. This causes the belt to wear much longer and to be much stronger than when made in the manner heretofore employed.

Fig. 8 shows a modified form in which the same general object is attained by a central extension 19 from each steel plate 20 formed as therein shown. Instead of each plate 20 having straight lateral edges, as the plates 17 in the previous figures, there is a central extension 19 on the advancing edge which projects into a corresponding cut-out portion or recess 21 in the plate 20 ahead of it. This gives the same leverage between the screw 18 and the advancing edge of the extension 19, as there is in the form shown in Figs. 5 and 6, and yet it enables the plate 20 to be on the whole centrally secured by the screws 18, although the central screws 18 are in the same position in relation to the lateral edges of the central part of the plate 20 as the screws 18 are to the lateral edges of the plates in Figs. 5 and 6.

The invention claimed is:

1. A transmission belt of the kind set forth including the combination with a continuous flexible belt body, wedging blocks on the inner side of the belt body, and metal plates on the outer side of the belt body corresponding with the wedging blocks, of means extending through each of said metal plates near one lateral edge thereof and through the belt body into the blocks for securing and holding the blocks in place.

2. A transmission belt of the kind set forth including the combination with a continuous flexible belt body, wedging blocks on the inner side of the belt body, and metal plates on the outer side of the belt body corresponding with the wedging blocks, of means extending through each of said metal plates near its following edge and through the belt body into said wedging metal blocks for holding them in place.

3. A transmission belt of the kind set forth including the combination with a continuous flexible belt body, wedging blocks on the inner side of the belt body, and metal plates on the outer side of the belt body corresponding with the wedging blocks, of means extending through each of said metal plates as far as possible from the advancing edge thereof and through said belt body into said blocks for securing and holding them in place.

4. A transmission belt of the kind set forth including the combination with a continuous flexible belt body, wedging blocks on the inner side of the belt body, and metal plates on the outer side of the belt body corresponding with the wedging blocks, of screws extending through said metal plates near the corresponding lateral edges thereof and through said belt body into said wedging blocks for securing and holding them in place.

In witness whereof I have hereunto affixed my signature.

MILTON O. REEVES.